United States Patent [19]

Rodriguez et al.

[11] Patent Number: 4,762,137

[45] Date of Patent: Aug. 9, 1988

[54] HEAT TRANSFER SYSTEM FOR TOBACCO CURING

[76] Inventors: Manuel V. Rodriguez, Virgen de la Cerca 23, Santiago de Compostela; Ramon M. Barrio, Priegue-Nigran; Juan P. Dobarro, La Coruña, all of Spain

[21] Appl. No.: 788,774

[22] Filed: Oct. 18, 1985

[30] Foreign Application Priority Data

Dec. 20, 1984 [ES] Spain ..................................... 538860

[51] Int. Cl.[4] ....................... B01F 3/02; G05D 21/00; A24B 3/12

[52] U.S. Cl. ...................................... 131/299; 62/524; 236/44 A; 236/44 C

[58] Field of Search .................. 131/290, 299; 62/524; 236/44 A, 44 C

[56] References Cited

U.S. PATENT DOCUMENTS

| | | | |
|---|---|---|---|
| 2,807,940 | 10/1957 | Urban | 62/524 |
| 3,067,587 | 12/1962 | McFarlan | 62/524 |
| 3,345,829 | 10/1967 | Hall | 62/524 |
| 4,424,933 | 1/1984 | Sutoh et al. | 236/44 A |
| 4,659,009 | 4/1987 | Newell | 236/44 C |

*Primary Examiner*—V. Millin

*Attorney, Agent, or Firm*—Ladas & Parry

[57] ABSTRACT

The heat transfer system is for drying agricultural products, especially tobacco, and comprises a plurality of evaporators associated with a condensor and a compressor in a closed circuit. Air is also circulated in a closed circuit, heat being provided by the condensor for drying the agricultural products, with the air subsequently being cooled and dehumidified by at least one of the evaporators. Humidity and temperature may be monitored and automatically controlled, and an external evaporator may also be provided to dissipate cold and absorb external heat.

11 Claims, 1 Drawing Sheet

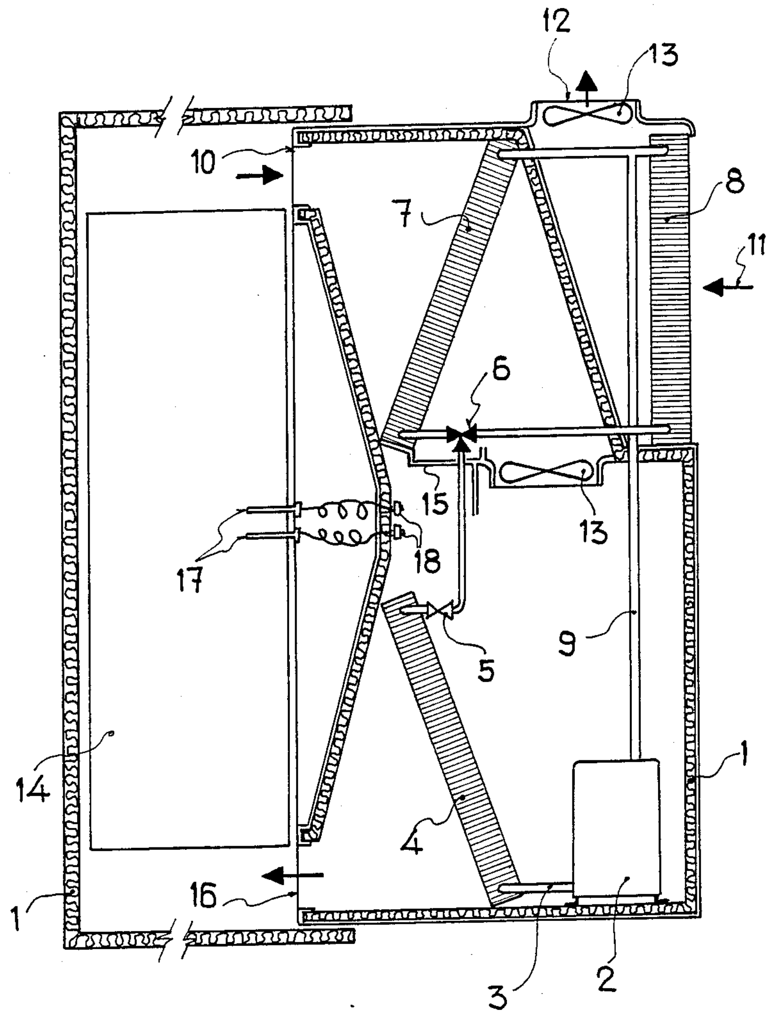
12
13
10
7
8
11
6
15
13
17
18
5
9
14
1
4
16
1
3
2

HEAT TRANSFER SYSTEM FOR TOBACCO CURING

The present invention relates to a heat transfer system for tobacco curing. The system is designed and conceived for its use as a means of curing certain agricultural products. However, it is designed more particularly for tobacco curing and especially and particularly for the curing of light tobacco.

The systems which have been used for light tobacco curing employ fuels which are complemented by adequate means of ventilation to eliminate the excess humidity by means of the renewal of air, in such a way that the means of ventilation expel the air saturated with humidity and take in outside air. This type of system results in a high energy loss in the form of latent and sensible heat. The process is regulated by thermostats which act upon the fuel burner, to maintain the temperature, which is set in advance. The humidity control is achieved by operating the respective sluices of the outside air intake.

This form of curing light tobacco, which may be said to constitute one of the states of the known art, requires a complex process which is divided into three basic stages.

In the first phase the so-called "yellowing" of the tobacco takes place, with a maximum dry temperature of 28° C. and a humid temperature of 36° C. This temperature must be obtained with an increase of 1° C. per hour. In this "yellowing" phase, the tobacco must lose 25% of its humidity.

In the second phase, the so-called "color fixing and leaf curing" takes place. In this phase the chamber must be maintained at 54° C. dry temperature and 40° C. humid temperature, so that the tobacco must lose 45% of its humidity.

In the third phase the so-called "vein curing" takes place, the temperature must be kept above 60° C. in a dry thermometer and 43° C. in a wet thermometer. In this phase the excess humidity remaining is eliminated, so that 8% remains in the product or tobacco.

To carry into effect these phases, it has been stated that fuels are used together with means of ventilation.

As a consequence of the increased cost in the last decade of petroleum products from which fuels are obtained, the utilization of refrigeration technology to generate heat has become profitable, owing to the saving involved in collecting heat energy from the environment. This has led to the appearance of numerous items of equipment and systems utilizing or based upon that technology which are called "Heat Pumps", designed for the air conditioning of premises.

The use of the conventional heat pump for tobacco curing makes it possible to obtain a certain energy saving by recovering the heat eliminated through the renewal of air. However the equipment designed, or which could be designed to recover heat in one phase of the process, would be useless in the other phases, which has been the reason why this technology has thus far, not been used in tobacco curing.

After numerous experiments and tests, the applicants of this invention have conceived and designed a system based on that very technology. Their invention is though, very different from that of a conventional heat pump. It is designed for use in curing tobacco and other agricultural products. The invention utilizes multiple evaporator which makes it possible to vary the capacity of dehumidification and contribution of calorific energy, according to the needs required by the product, and without requiring any complementary energy.

The above mentioned multiple evaporator is complemented by a condenser and compressor to define a closed circuit for a gas. The closed circuit dehumidifies and heats air impelled by a ventilation unit circulating in a closed circuit through a mass of product or tobacco. In this way the humidity is extracted from the product by recirculating a mass of air through the assembly which constitutes the system, without the need for air renewal and by means of a closed circuit between the curing chamber and the system in question.

All the energy lost in the evaporation stage is collected by the condenser again, the energy being increased due to the consumption of the compressor.

In summary, the system of the invention bases its operation on a closed cycle where the air of the dryer is always the same and humidity is eliminated by condensation of water. In the conventional systems using heat pumps, the circuit would be an open circuit in which dehumidification takes place by the expulsion of saturated air, and by the introduction of outside air which rises in temperature in the condenser. In this case the evaporator would be an energy collector which would recover the heat of the renewed air, or collect energy from the external environment.

The complex process of curing light tobacco requires a variable operation of the system with different heat and dehumidification needs for each stage, which requires a special design of the system in order to be able to vary the cooling capacity of the evaporator and heat contribution capacity of the condenser.

The system of the present invention having a closed circuit with multiple evaporators, manages to solve the problems raised by the process of curing light tobacco and achieves:

A better quality of tobacco, maintaining it in a closed chamber with precise temperature and humidity controls.

A considerable fuel saving, (a conventional dryer consumes 0.8 kWh and 0.9 l/h of Gasoil C per kg of cured tobacco, whereas the present transfer system consumes only 2 kWh); and Easy installation and maintenance as fuel fittings are not used.

The present invention enables the curing of tobacco by a very complex process without any type of support and independently of weather conditions. This system therefore, may be used to effect the drying of any other agricultural product.

To facilitate a better understanding of the characteristics of the invention, a detailed description will be given, based on a sheet of drawings attached to this descriptive report, forming an integral part of it, and on which, for guidance only and not limitative in any way, a schematic view of what could be considered to be the assembly of parts making up the system has been represented, in such a way that the said representation of design has been made to make it possible to understand the operation and basic characteristics of the heat transfer system itself.

The numerical references in said FIGURE or schematic design correspond to:

1. General casing with insulation
2. Compressor
3. Compressor outlet copper duct (2)
4. Condenser 5. Expansion valve
6. Three way valve
7. Internal evaporator battery
8. External evaporator battery
9. Compressor (2) inlet duct
10. Air return mouth or opening
11. Outside air entrance
12. Outside air outlet
13. Fan equipment
14. Mass of tobacco
15. Condensation tray
16. Tobacco chamber air inlet
17. Heat probes
18. programmer The system, according to the schematic FIGURE referenced, is integrated in a general casing (1) formed of a sheet with insulation to prevent condensation, the assembly of the system comprising a compressor (2) supported on silent blocks and insulated by a suitable acoustic casing. This compressor (2) will compress a refrigerating gas, for example freon which circulates down a copper duct (3) to pass first through the condenser battery or condenser (4). The condenser being comprised of a coil of copper with fins in which the gas, cooled by the passage of air, condenses. An expansion valve (5) regulates the passage of the refrigerating fluid in the liquid state, which when compressed, is distributed by a three way valve (6) to the evaporator batteries (7) and (8), in which evaporation takes place by means of absorbing heat from the return air. Compressor (2) sucks back the gas through duct (9) thereby acting to close the circuit.

The above mentioned return of air from which the heat is absorbed, occurs through the opening (10), whereas the inlet of outside air is that referenced with (11) and the outlet to the outside that referenced with (12).

At the top a fan has been provided formed by the fans (13), dimensioned to work at medium-high temperatures to suck the air from the chamber in which the mass of tobacco is housed (14). This air, when passing through the evaporating battery (7) is cooled and the humidity resulting therefrom is caught by the condensation tray (15) and taken outside. Cold saturated air is impelled through the condensor (4) where its temperature is raised and its relative humidity reduced. It then passes through the bottom part or mouth (16) to the tobacco chamber, so that when passing through the tobacco mass (14) it will absorb the humidity from the tobacco mass and return at the top, through the mouth or opening (10) to the system, thus closing the circuit.

The regulation of the curing process is achieved by thermal probes (17), which measure the dry and humid temperature. By means of a programmer (18) probes (17) regulate the three way valve (6) to vary the amount of evaporation which may take place so that this evaporation will occur in the external battery (8) with a collection of outside energy, or in the internal battery (7) providing dehumidification for the air of the tobacco chamber. By this regulation it is possible to maintain the humidity at a fixed point and provide the necessary heat.

Using this system, tobacco and any type of agricultural product may be cured, as it has a follow-up capacity in any type of curing curve, independently of the weather conditions, and also having a capacity for the regulation of temperature and humidity autonomously, all of which makes the system into a means which may be used in the most effective and profitable form for the curing of light tobacco, other tobacco types and even other agricultural products.

We claim:

1. A closed heat transfer system comprising:

a compressor;

a condenser connected to said compressor;

a first evaporator and a second evaporator, said first and second evaporators being connected in parallel to one another and in series to said condenser and said compressor;

a three-way distribution valve located between said evaporators and said condenser;

a plurality of probes, said probes measuring temperature and humidity;

a programmer, said probes and said programmer acting to regulate said three-way valve; and a casing surrounding all but the second evaporator such that gas carried from said compressor to said condenser is condensed into a liquid in said condenser and then carried into said evaporators where it again becomes a gas and is returned to said compressor and such that air passing through said first evaporator and said condenser is cooled to remove humidity and then reheated to further remove humidity as it cycles through said condenser and back to said first evaporator.

2. A closed heat transfer system for curing tobacco, said system being comprised of:

a compressor for compressing a refrigerating gas;

a condenser generally connected to said compressor for receiving and condensing said gas into a liquid;

an internal battery having a first end and a second end, said first end being generally connected to said condenser, said second end being generally connected to said compressor, said internal evaporator receiving said liquid from said condenser and enabling said liquid to return to its gaseous state as it passes through said internal evaporator and out of said second end to said compressor;

air circulating means situated between said internal evaporator and said condenser; and a casing having a first chamber, said first chamber generally enclosing said compressor, said condenser, said internal evaporator, and said air circulating means such that said air circulating means continuously cycles air in said casing by pulling the air through said internal evaporator which causes said air to cool and be dehumidified, then impelling the air through said condenser to be heated and further dehumidified, said air then returning to said internal evaporator to begin the cycle again.

3. The closed heat transfer system of claim 2 wherein said casing has a second chamber attached to said first chamber, said first and second chambers defining between them an inlet and an outlet, said inlet being located near said internal evaporator, said outlet being located near said condenser such that air passing through said condenser is impelled through said outlet into said second chamber and passes through said second chamber toward said inlet and into said internal evaporator, said second chamber being used to house the tobacco such that when said air passes from said condenser into said second chamber, it absorbs the humidity from said tobacco, said moistened air then being dehumidified in its route through said inlet and said first chamber.

4. The heat transfer system of claim 2 further comprising an external evaporator, said external evaporator having a top and a bottom end and being connected in parallel to said internal evaporator such that said bottom end connects to said first end of said internal evaporator and to said condenser and said top end connects to said second end of said internal evaporator and to said compressor, said external evaporator being located outside of said casing.

5. The closed heat transfer system according to claim 4 further comprising: a three-way distribution valve, said distribution valve being connected between said evaporators and said condenser and acting to distribute the gas carried by said condenser to said evaporators.

6. The closed heat transfer system according to claim 5 further comprising: an expansion valve, said expansion valve being connected between said condenser and said three-way distribution valve.

7. A heat transfer system according to claim 1 wherein there are two of said probes.

8. The closed heat transfer system of claim 6 further comprising at least one probe, said probe being located in said second chamber and connected to said three-way valve to regulate the amount of evaporation which may take place in said casing by regulating the amount of liquid gas which passes to said internal evaporator and to said external evaporator.

9. The closed heat transfer system of claim 8 further including a programmer associated with said at least one probe and said three-way valve for accomplishing the regulation of said three-way valve in view of the humidity and temperature information provided by said at least one probe.

10. The closed circuit of claim 4 further comprising an air circulating means associated with said external evaporator and located outside of said casing, said air circulating means circulating air about said external evaporator enabling said liquified gas passing through said external evaporator to become gaseous as it passes through said external evaporator to said compressor.

11. The closed heat transfer system of claim 2 further comprising a condensation tray associated with said internal evaporator, said condensation tray acting to collect condensation from said air passing through said internal evaporator and carrying said condensation out of said casing.

* * * * *